United States Patent [19]

Van Der Tol

[11] Patent Number: 5,528,708
[45] Date of Patent: Jun. 18, 1996

[54] METHOD AND APPERTAINING PAIR OF MASK PATTERNS FOR FABRICATING, WITH THE APPLICATION OF DOUBLE MASKING, INTEGRATED OPTICAL WAVEGUIDE STRUCTURES

[75] Inventor: Johannes J. G. M. Van Der Tol, Zoethermeer, Netherlands

[73] Assignee: Koninklijke PTT Nederland N.V., Groningen, Netherlands

[21] Appl. No.: 388,366

[22] Filed: Feb. 14, 1995

[30] Foreign Application Priority Data

Feb. 22, 1994 [NL] Netherlands ............................ 9400266

[51] Int. Cl.⁶ .................................................. G02B 6/125
[52] U.S. Cl. ............................ 385/14; 156/629.1; 385/45; 385/130
[58] Field of Search .................................. 385/39, 40, 44, 385/45, 129–132, 14; 156/629.1–632.1, 645.1, 648.1, 649.1, 662.1

[56] References Cited

U.S. PATENT DOCUMENTS

| | | | |
|---|---|---|---|
| 4,674,827 | 6/1987 | Izutsu et al. | 385/132 |
| 5,148,505 | 9/1992 | Yanagawa et al. | 385/45 X |
| 5,293,436 | 3/1994 | Diemeer | 385/45 X |
| 5,364,495 | 11/1994 | Van Der Tol et al. | 156/649.1 |

OTHER PUBLICATIONS

Y. Shani et al; "Buried Rib Passive Waveguide Y Junctions with Sharp Vertex on InP"; Mar. 1991; pp. 210–212; IEEE Photonics Technology Letters; vol. 3, No. 3.

D. A. Smith et al; "A Mode–Evolution–Type Integrated–Optical Beam combiner for Coherent Receivers"; Apr. 1991; pp. 339–341; IEEE Photonics Technology Letters; vol. 3, No. 4.

*Primary Examiner*—John D. Lee
*Attorney, Agent, or Firm*—Frishauf, Holtz, Goodman, Langer & Chick

[57] ABSTRACT

An alignment-tolerant fabrication of a waveguide structure having a symmetrical component structure and an asymmetrical component structure such as an asymmetrical X junction, with the aid of the technique of double masking is presented. The entire waveguide structure is defined by two different mask patterns ($p_1$, $p_2$) which are applied successively and in a mutually overlapping position. The two mask patterns are aligned with respect to one another according to alignment directions parallel (z-axis) and perpendicular (x-axis) to the axis of symmetry of the symmetrical component structure. Each mask pattern comprises a first asymmetrical component pattern (32;35) and a second asymmetrical component pattern (31,33; 34,36). The first component patterns (32 and 35) each define a separate portion of the asymmetrical component structure. The second component patterns ((31,33) and (34,36)) are mirror images of one another and comprise component shapes (33;36) which depend on a predefined alignment accuracy ($w_1$) in the alignment direction perpendicular (x-axis) to the axis of symmetry.

20 Claims, 8 Drawing Sheets

METHOD AND APPERTAINING PAIR OF MASK PATTERNS FOR FABRICATING, WITH THE APPLICATION OF DOUBLE MASKING, INTEGRATED OPTICAL WAVEGUIDE STRUCTURES

A. BACKGROUND OF THE INVENTION

1. Field of the Invention

The invention is in the field of integrated optics. More in particular, it relates to a method for the fabrication of a waveguide structure with the application of double masking, which waveguide structure includes a symmetrical part and an asymmetrical part, and to a pair of mask patterns for applying the method.

2. Prior Art

In an optical input section of a coherent optical receiver a mixing element is present for mixing a locally generated optical laser signal and an incoming optical communication signal. It is known from reference [1] that in an integrated version of an optical input section of this type such a mixing element can be constructed as an asymmetrical X junction which in fact is composed from a symmetrical and an asymmetrical Y junction, both having single-mode waveguiding branches and coupled via a dual-mode connecting channel. An asymmetrical X junction of this type is polarization- and wavelength-independent, has a high degree of fabrication tolerance, and operation is independent of the length of the dual-mode waveguide channel. The function of the asymmetrical Y junction is that of mode filter or splitter. For the purpose of operating in this way, the single-mode branches of the asymmetrical Y junction have different propagation constants, for example due to a difference in width. From an optical signal which, in the dual-mode waveguide channel propagates in the direction of the asymmetrical Y junction in accordance with the fundamental guided mode, will continue to propagate in that branch of the asymmetrical Y junction, which has the highest propagation constant, while such an optical signal which, in the dual-mode waveguide channel, propagates according to a first-order guided mode, will continue to propagate in the other branch. It is a known problem, however, that if the vertex of such an asymmetrical Y junction is not sufficiently sharply defined, particularly as a result of unduly limited photolithographic resolution in the vertex during fabrication, the filtering or splitting action is insufficient. In reference [2] and in a patent application by applicant, unpublished at the priority date of the present invention, see reference [3], solutions for this problem are described on the basis of a technique of double masking. According to these solutions, an asymmetrical Y junction having a sharp vertex is obtained by defining the two branches of the Y junction in different mask layers which overlap one another. If applied to the implementation of an asymmetrical X junction, a first mask pattern could define the symmetrical Y junction, the dual-mode connecting channel and a branch of the asymmetrical Y junction, and a second mask pattern could define the remaining branch of the asymmetrical Y junction. Reference [3] also states (page 9, lines 1–6), that the two mask patterns do require alignment features, but that these primarily relate to the angle between the two branches of the asymmetrical Y junction, rather than the relative position of the two branches with respect to one another. Such positional alignment tolerance for the orientation of the mask patterns with respect to one another is most convenient during fabrication. Simulations of the asymmetrical Y junction according to a method which is known under the name beam propagation method have shown that in a direction according to the signal propagation direction in the connecting channel said alignment tolerance does indeed exist, but that in a direction perpendicular thereto a mutual displacement of the two mask patterns in the order of a few microns with respect to one another results in large variation in mode suppression (typically from −16 dB to −30 dB for a shift of ±1 μm with respect to the most favourable position). For a wavelength- and polarization-independent operation of the asymmetrical X junction as a whole, such a variation even if only in the mode suppression in the asymmetrical Y junction is, however, unacceptable. In order to make alignment tolerant fabrication of the asymmetrical X junction possible, said mode suppression in the asymmetrical Y junction must however be better, over the entire tolerance range, than a preset value (typically −30 dB). In that case, the splitting ratio in the X junction, when used as a mixing element in a coherent receiver, will at all times deviate within acceptable limits (typically 0.5 dB) from a fifty-fifty distribution, which keeps the deterioration of the coherent detection within limits (typically up to 1 dB).

Figure 1:
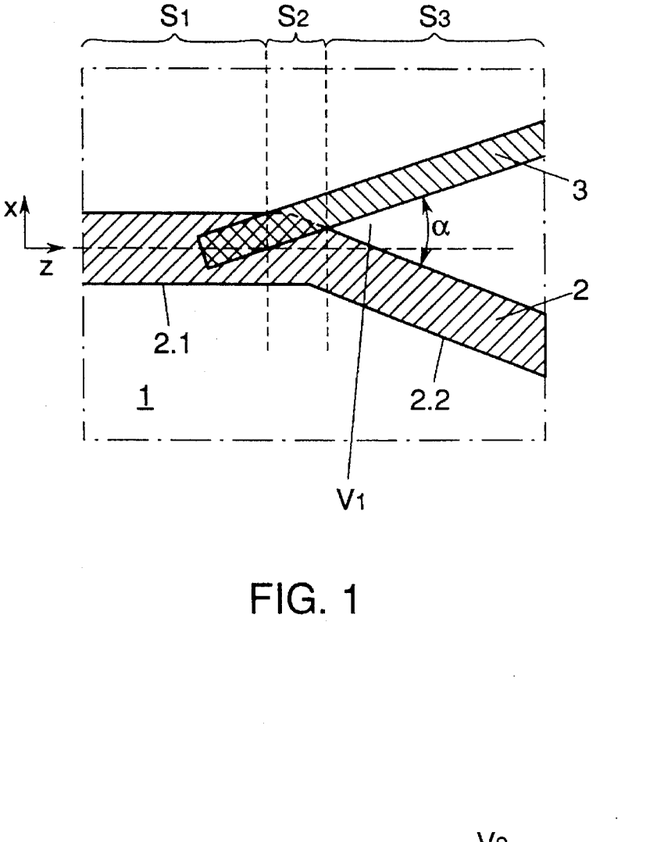
FIG. 1 shows, in top view, a stage of processing of a layer stack according to the prior art.

The simulations have further shown that the variation in mode suppression depends not so much on the asymmetrical Y junction itself, but on a symmetry-breaking transition of the dual-mode connecting channel as far as the vertex of the asymmetrical Y junction. The symmetry-breaking enables coupling, in said transition, between guided modes of the zero and first order, as a result of which the mode suppression is affected negatively. The extent of the symmetry-breaking is closely related to the geometrical shape of the transition, which can vary considerably with the relative position of the two mask patterns used during fabrication with respect to one another. Let FIG. 1 illustrate this. It shows, in a top view, a top face 1 of a layer stack to be processed, to which a first mask pattern 2 and a second mask pattern 3, which overlaps the first mask pattern, have been applied, which together define an asymmetrical Y junction. The first mask pattern 2 consists of a first part 2.1 and a second part 2.2, for the definition of the dual-mode trunk and one of the lateral branches of the asymmetrical Y junction, respectively. The second mask pattern 3 defines the other lateral branch of the asymmetrical Y junction. The space of the top face 1 between the second part 2.2 of the first mask pattern 2 and the second mask pattern 3 forms a vertex $V_1$ having a vertex angle α. For the top face 1, an (xz) coordinate system has been specified, whose z-axis coincides with an axis of symmetry of the first part 2.1 of the first mask pattern 2. As seen in a direction according to the z-axis, three sections can be distinguished in the coverage of the top face 1, viz. a symmetrical section $S_1$, a symmetry-breaking transition section $S_2$ and, from vertex $V_1$, an asymmetrical section $S_3$, the asymmetrical Y junction proper. The length and the shape of the symmetry-breaking transition section $S_2$ are strongly dependent on the position of the second mask pattern with respect to the first mask pattern, i.e. on the degree of accuracy with which, during fabrication, the two mask patterns are aligned with respect to one another. Since for an asymmetrical Y junction which functions as a mode splitter, the vertex angle is small (typically α≈5 mrad), the alignment accuracy particularly in a direction perpendicular (x-axis) to the axis of symmetry (z-axis) is much more important than that in a direction according to the axis of symmetry. The formation of such a symmetry-breaking transition section can be counteracted by the two mask patterns being positioned with respect to one another with a very high alignment accuracy, particularly in the x direction. Such an alignment accuracy, in which the symmetry-breaking transition section is not or virtually not formed, cannot be achieved in practice, however. Alternatively, the effect of such symmetry-breaking could be diminished by a further reduction in the vertex angle α, which must go hand in hand, however, with an undesirable lengthening of the asymmetrical Y junction and thus of the asymmetrical X junction in its integrated form.

B. SUMMARY OF THE INVENTION

An object of the invention is to enable fabrication of an asymmetrical X junction on the basis of the technique of double masking, known per se, which is alignment-tolerant. More generally, it is an object of the invention to enable such alignment-tolerant fabrication of a waveguide structure which comprises a symmetrical component structure and an asymmetrical component structure adjoining the symmetrical component structure. The invention achieves this by having the transition section defined by two mask component patterns which are mirror images of one another and which have shapes and dimensions which depend on the desired alignment accuracy in the most critical alignment direction, so that within the range of tolerance no symmetry-breaking in the transition section will occur. In so doing, the invention exploits the fact that two shapes which are mirror images of one another can always be combined into a shape having an axis of symmetry. The invention provides a method for the fabrication of an optical waveguide structure on/in a layer stack including a light-guiding layer, which layer stack is hereinafter designated as substrate, which waveguide structure includes an asymmetrically branched component structure, which method comprises the following steps:

applying a first mask pattern of a first mask material to a surface of the substrate for defining a part of the waveguide structure, applying a second mask pattern of a second mask material to that surface of the substrate which is provided with the first mask pattern, in a position which partly overlaps the first mask pattern, for the purpose of defining, together with the first mask pattern, the entire waveguide structure, treating portions of said surface of the substrate, which are not covered by the first and second mask pattern, with the aid of means which modify the substrate material, wherein the optical waveguide structure further includes a symmetrically branched component structure which, via a symmetrically tapered intermediary waveguide is coupled to the asymmetrically branched component structure, and the mask patterns each include a first asymmetrical component pattern and a second asymmetrical component pattern, the first component patterns each defining an essentially separate component of the asymmetrical component structure, and together defining all of the latter, and the second component patterns having shapes which are mirror images of one another, and wherein the step of applying the second mask pattern comprises a substep in which the second mask pattern is aligned with respect to the first mask pattern according to alignment directions essentially parallel and perpendicular to an axis of symmetry of the symmetrically branched component structure of the waveguide structure to be fabricated, the shape of the second component patterns depending on a predefined alignment tolerance in the alignment direction perpendicular to said axis of symmetry.

Preferred embodiments are summarized in subclaims.

The invention provides a fabrication method which is completely compatible with RIE-processing of waveguides, which is suitable for all III–V semiconductors, no additional epitaxial layers being necessary, and with which an asymmetrical X junction is obtained having very good splitting ratios and stable operation, which is polarization- and wavelength-independent, and which is readily integrable with other functions.

C. REFERENCES

[1] D. A. Smith et al. "A mode-evolution-type integrated-optical beam combiner for coherent receivers", IEEE Phot. Techn. Letters, Vol. 3, No. 4, April 1991, pp. 339–341;

[2] Y. Shani et al., "Buried rib passive waveguide Y junctions with sharp vertex on InP", IEEE Photonics Technol. Letters, vol. 3, no. 3, March 1991, pp. 210–212;

[3] Dutch Patent Application No. 9301071 (by Applicant), filed 18-06-1993.

All references are deemed to be incorporated by reference in the present application.

D. BRIEF DESCRIPTION OF THE DRAWING

The invention will be explained with reference to a drawing which comprises the following figures:

FIG. 5 shows a second pair of patterns in a partially superimposed position as a contunation of the first pair of patterns in a position as shown in FIG. 4a;

FIG. 6 shows a third pair of patterns in a partially superimposed position as a continuation of the first pair of patterns in a position as shown in FIG. 4a;

E. DESCRIPTION OF A SPECIFIC EMBODIMENT

Reference [3] describes a method for the fabrication of a branched waveguide structure such as an asymmetrical Y junction on or in a substrate of, for example, III–V semiconductor materials such as indium phosphide (InP), having a very sharp vertex in the fork. This known method comprises a number of process steps during which two different mask patterns of two different mask materials are applied in a partly mutually overlapping position to form a combined mask pattern. In a subsequent process step, said combined mask pattern is employed to obtain the desired branched waveguide structure. Essentially the same method can be applied to fabricate a partly symmetrically branched, partly asymmetrically branched waveguide structure of channel-type waveguides, such as an asymmetrical X junction, on or in a substrate of this type.

Figure 2:
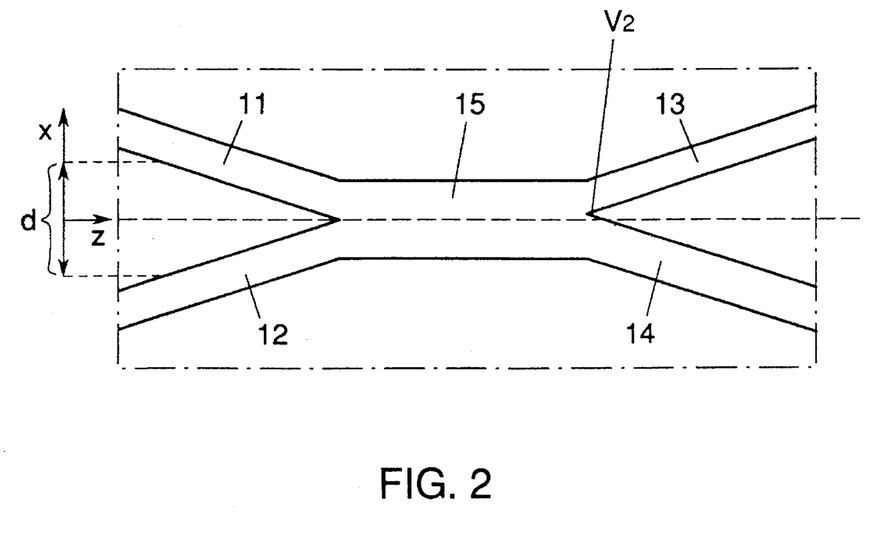
FIG. 2 schematically shows an asymmetrical X junction known per se.

FIG. 2 schematically depicts such an asymmetrical X junction, known per se. It consists of a symmetrical Y junction having two identical single-mode converging input channels 11 and 12, an asymmetrical Y junction having two non-identical single-mode diverging output channels 13 and 14, and a dual-mode coupling channel 15 which links the two Y junctions "back to back". A z-axis has been chosen in accordance with the axis of symmetry of the symmetrical Y junction. The vertex of the asymmetrical Y junction between the output channels 13 and 14 is indicated by $V_2$. In order to function properly, such an asymmetrical X junction needs to be exactly symmetrical from where the converging input channels come within their interaction spacing d, up to the vertex $V_2$ of the asymmetrical Y junction. The width of the in- and output channels is in the order of a few microns. The angle at which the input channels converge is in the order of 20 mrad, while the length of the input channels is in the order of tenths of millimeters. The angle at which the output channels diverge is in the order of 5 mrad, while the length of the output channels is in the order of millimeters. It should be noted that the terms in- and output channels are mutually interchangeable, since the function of an asymmetrical X junction of this type is exactly the same in both directions.

To align two mask patterns with respect to one another, both patterns additionally have alignment features added to them, which during alignment must be in register with one another. Since this always takes place with a certain inaccuracy, the exact symmetry required for the asymmetrical X junction cannot be readily achieved by means of the mask patterns employed in the known method. Particularly the alignment in a direction perpendicular to the axis of symmetry is very critical in this case. Hereinafter, a specific pair of mask patterns is described for the fabrication of a partly symmetrically, partly asymmetrically branched waveguide structure, such as the said asymmetrical X junction. This pair of mask patterns makes it possible, with the aid of the known process steps, to fabricate a waveguide structure which within a practicable/usual alignment tolerance in a direction perpendicular to the axis of symmetry is always exactly symmetrical as far as the vertex of the asymmetrical fork.

Figure 3:
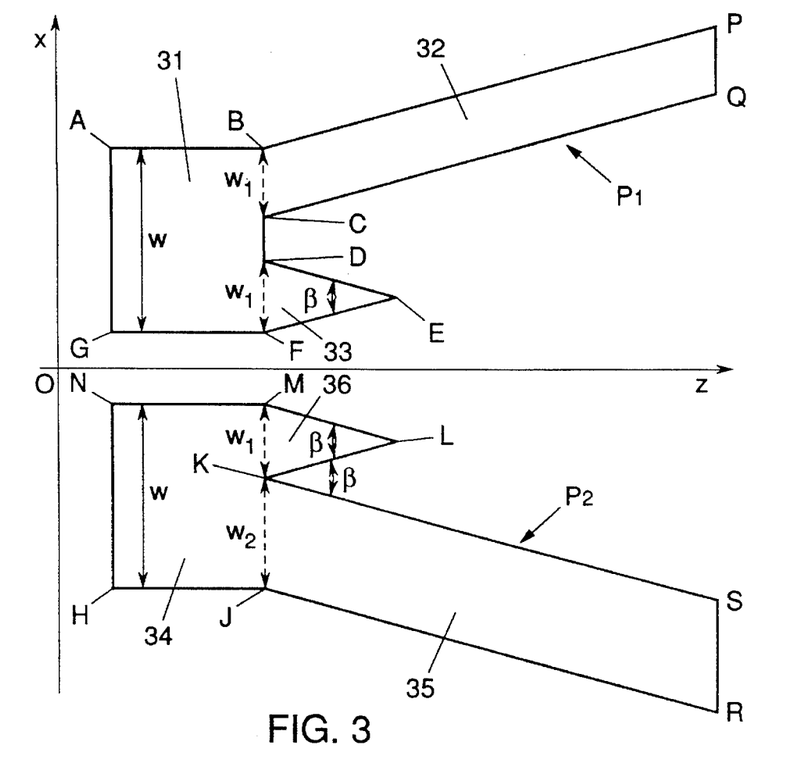
FIG. 3 shows a first pair of patterns in an xz-plane according to the invention.
Figure 4A:
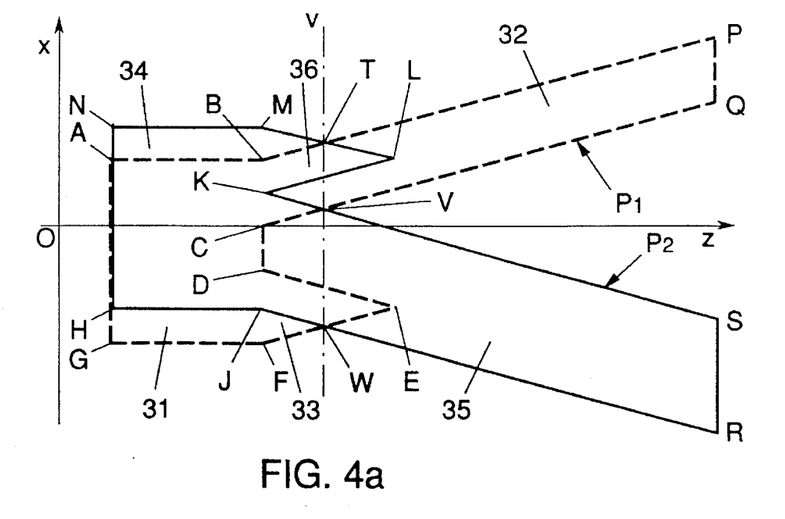
FIG. 4a shows the patterns of FIG. 3 in a first superimposed position.
Figure 4B:
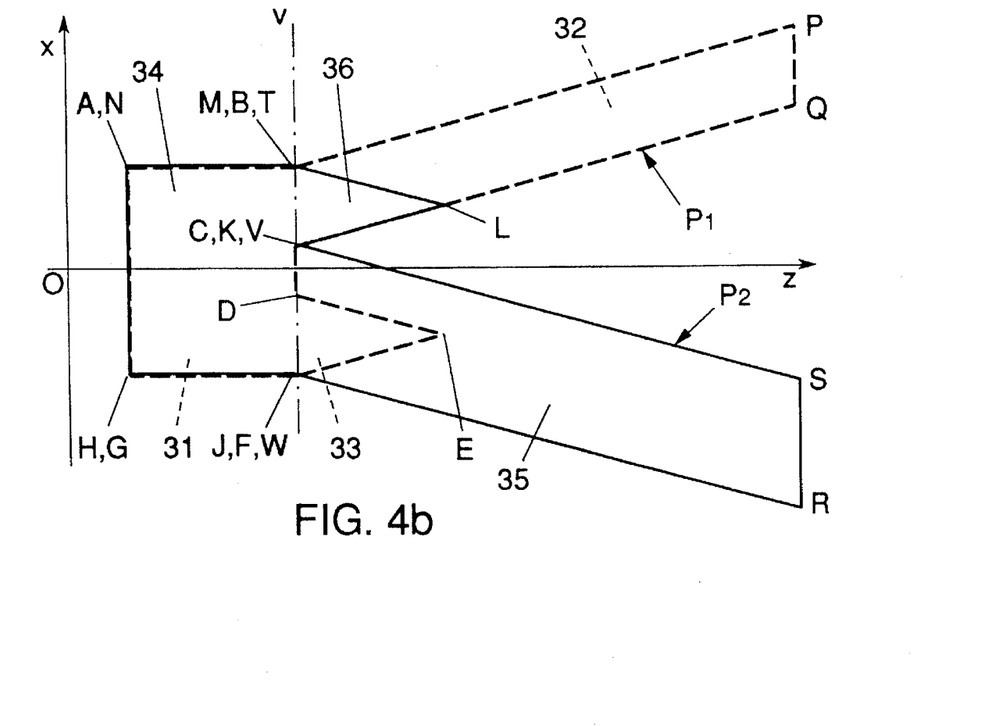
FIG. 4b shows the patterns of FIG. 3 in a second superimposed position.
Figure 4C:
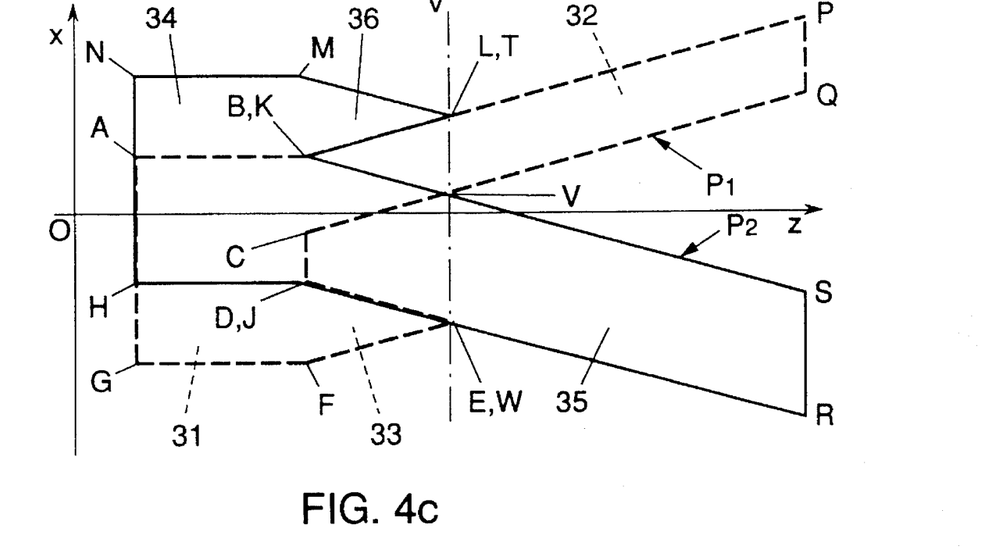
FIG. 4c shows the patterns of FIG. 3 in a third superimposed position.
Figure 5:
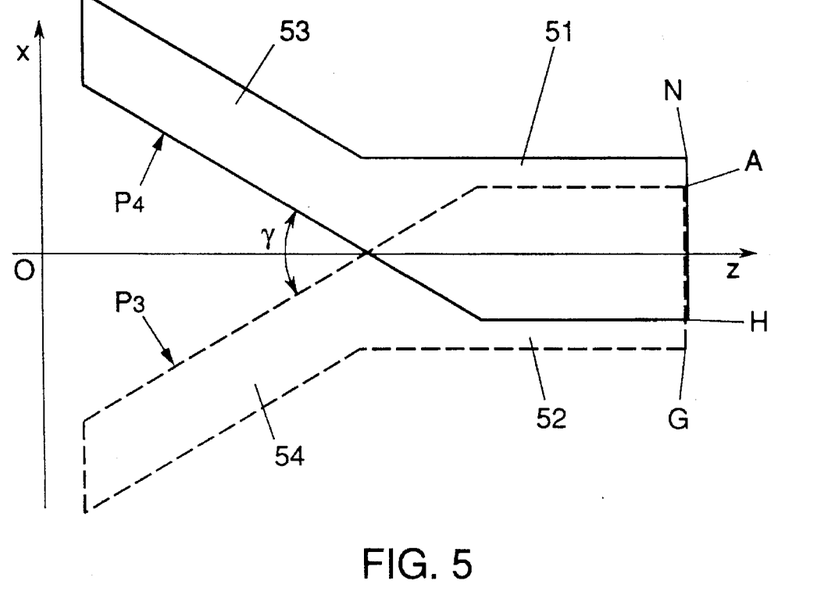
Figure 6:
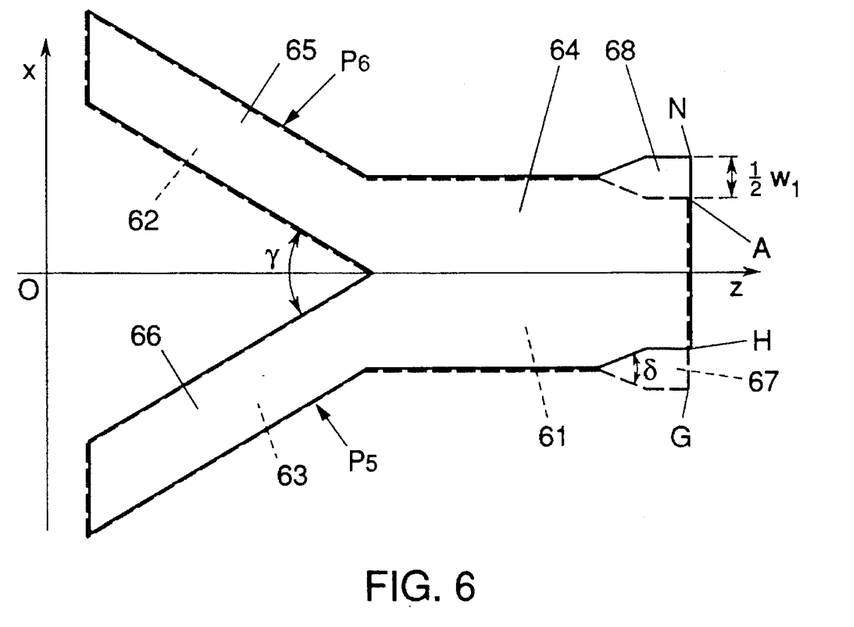

FIG. 3 shows, in the plane of the drawing, with respect to a system of coordinates (x, z) having orthogonal x- and z-axis and origin O, two planar patterns $p_1$ and $P_2$. The first pattern $p_1$, above the z-axis, comprises a wide strip-type part 31, depicted as rectangle ABFG. The rectangle ABFG has, on the side BF, a narrow strip-type spur 32, depicted as parallelogram BCQP whose short side BC has a length $w_1$, and a triangular spur 33 having vertices D, E and F, and whose base DF likewise has a length $w_1$. The second pattern $p_2$ comprises a wide strip-type part 34, depicted as rectangle HJMN. The rectangle HJMN has, on the side JM, a wide strip-type spur 35, depicted as parallelogram JKSR whose short side JK has a length $w_2$, and a triangular spur 36 having vertices K, L and M, and whose base KM has a length $w_1$. The polygons ABDEFG and HJKLMN form mirror images of one another, the z-axis being an axis of symmetry. The sides AB and FG of the rectangle ABFG, and the sides HJ and MN of the rectangle HJMN run parallel to the z-axis. The triangles DEF and KLM are isosceles with an apical angle β. The side DE (ML) of the triangle DEF (KLM) runs parallel to the sides KS and JR of the wide spur 35, while the other side FE (KL) runs parallel to the sides CQ and BP of the narrow spur 32. The sides AG and HN have a length $w=w_1+w_2$. If the patterns $p_1$ and $p_2$ are slid, parallel to the x-axis and symmetrically with respect to the z-axis, on top of one another until the points E of the triangle DEF and L of the triangle KLM come to lie within the wide and the narrow, respectively, strip-type spur, a combined pattern is formed which, if appropriately dimensioned, is very suitable as a mask pattern for the fabrication of an asymmetrical Y junction. Such a combined pattern is depicted for three different positions of the patterns $p_1$ and $p_2$ with respect to one another, in FIG. 4a, FIG. 4b and FIG. 4c, respectively. For the sake of distinction, pattern $p_1$ is represented by a broken dashed line, pattern $p_2$ by a continuous line. At the point where the contours of the two patterns put together coincide, the continuous line and the broken dashed line are drawn next to one another. In FIG. 4a the position is such that the apex (point L) of triangle KLM lies within the narrow strip-type spur 32, in the figure at half the width of the spur. The contour ABPQCDEFGA of pattern $p_1$ and the contour HJRSKLMNH of pattern $p_2$ intersect one another in three points T, V, and W, which lie on the same vertical line v. V is also the point where, in the combined pattern, the narrow strip-type spur 32 and the wide strip-type spur 35 diverge and no longer overlap. In a manner similar to that of FIG. 4a, FIG. 4b and FIG. 4c depict the patterns $p_1$ and $p_2$ in extreme positions with respect to one another, specifically in such a way that the side KL coincides with the one (CQ) or the other side (BP) of the narrow strip-type spur 32. (N.B. coinciding vertices of the contours are in this context indicated by both vertex letters, separated by a comma). It can be seen from these figures that, whatever position during displacement in the vertical sense the patterns $p_1$ and $p_2$ adopt with respect to one another within the extreme positions depicted in FIG. 4b and FIG. 4c, the contour of the combined pattern to the left of the line v, i.e. TMNGFW, is always symmetrical, while to the right of the line v the strip-type spurs 32 and 35 diverge. For use of patterns such as $p_1$ and $p_2$ for the fabrication of an asymmetrical X junction, these patterns must be further extended with parts which, in combination, can define the symmetrical Y junction. Such an extension is possible in two ways. The first possibility is shown in FIG. 5. This depicts asymmetrical patterns $p_3$ (broken dashed line) and $p_4$ (continuous line) which form mirror images of one another with respect to the z-axis, and which form direct continuations of, respectively, the patterns $p_1$ and $p_2$ in the points A and G, and H and N for a position of the patterns $p_1$ and $p_2$ with respect to one another as shown in FIG. 4a. Each of the patterns $p_3$ and $p_4$ comprises a wide strip-type part 51 and 52, respectively, parallel to the z-axis, said part merging with a narrow strip-type spur 53 and 54, respectively, at an angle ±½ γ with the z-axis. An advantage of this extension possibility for the definition of the entire asymmetrical X junction is the simplicity of the continuation and the sharp vertex of the symmetrical Y junction. A drawback is, however, that in the case of use in two successive masking steps the dimensioning of the narrow strip-type spurs 53 and 54 for the definition of the input channels (11 and 12 in FIG. 2) of the symmetrical Y junction may differ, as a result of which the symmetry is still broken. A second possibility is shown in FIG. 6. This depicts two patterns $p_5$ (broken dashed line) and $p_6$ (continuous dashed line) which are mirror images of one another and comprise a symmetrical part and an asymmetrical part. The symmetrical part of the pattern $p_5$ comprises a wide strip-type part 61 adjoining two converging narrow strip-type spurs 62 and 63, and the symmetrical part of the pattern $p_6$ comprises a wide strip-type part 64 adjoining two converging narrow strip-type spurs 65 and 66. Both the symmetrical parts are such that each separately is able to define a symmetrical Y junction. The patterns $p_5$ and $p_6$ must form such continuations of the patterns $p_1$ and $p_2$ that the symmetrical parts of the patterns $p_5$ and $p_6$ are precisely in register when the patterns $p_1$ and $p_2$ are situated in the middle position, depicted in FIG. 4a, with respect to one another. Owing to the fact that in said middle position the points A and N, and H and G of the patterns $p_1$ and $p_2$ (see FIG. 4a) do not coincide, the wide strip-type parts 61 and 64 of the patterns $p_5$ and $p_6$ cannot form the direct continuations of the rectangles ABFG and HJMN of the patterns $p_1$ and $p_2$, asymmetrical adjustment being necessary instead. For the pattern $p_5$, said adjustment consists of an asymmetrical slip 67 between the wide strip-type part 61 and the rectangle side AG of the rectangle ABFG in a negative x direction, while that for the pattern $p_6$ consists of an asymmetrical slip 68 between the wide strip-type part 64 and the rectangle side HN of the rectangle HJMN of the pattern $p_2$ in a positive x direction. Both slips 67 and 68 are again mirror images of one another with respect to the z-axis. The absolute magnitude of the slip in the x direction is equal to half the distance between the points N and A at the patterns $p_1$ and $p_2$ in their middle position with respect to one another, i.e. equal to $\frac{1}{4}w_1$. The slips 67 and 68 have at least such a length (in the z direction) that together they are able to define, within the extreme positions of the patterns $p_1$ and $p_2$, an adiabatically wave-guiding tapered piece. That is to say that the changes in width of such a wave-guiding tapered piece in the z directions must occur so gradually that as a result no mode conversions occur therein. Consequently, an angle $\delta$ between the directions of the slips 67 and 68 with respect to one another is subject to a maximum. The width of the narrow strip-type spurs 62, 63, 65 and 66 must be chosen in such a way that in the combined pattern, for any position of the patterns $p_5$ and $p_6$ within the extreme positions, the spurs 62 and 65, and the spurs 63 and 66 at all times define a single-mode waveguide.

An example of the second possibility is worked out in more detail and explained with reference to FIG. 7a to 7c inclusive. Each of these figures shows a combined pattern which is formed from patterns $p_7$ (broken dashed line) and $p_8$ (continuous line) for the fabrication of an asymmetrical X junction. It should be noted that where, in the combined pattern, the contours of the patterns $p_7$ and $p_8$ coincide, only the continuous line is drawn. The pattern $p_7$ is a composite of two patterns which correspond to the patterns $p_1$ (see FIG. 3) and $p_5$ (see FIG. 6) and the pattern $p_8$ is a composite of two patterns which correspond to the patterns $p_2$ (FIG. 3) and $p_6$ (FIG. 6). The two patterns are applied, according to the known technique of double masking (see, for example, reference [3]) as masking patterns, successively and partly on top of one another, to a layer stack to be treated in order to form thereon or therein a waveguide structure suitable for an asymmetrical X junction. The figures FIG. 7a to 7c inclusive depict the patterns $p_7$ and $p_8$ in three different alignment positions with respect to one another. These positions correspond, respectively, to the middle position and the two extreme positions in which the patterns $p_1$ and $p_2$ are depicted with respect to one another in FIG. 4a, FIG. 4b and FIG. 4c. The various parts of the patterns $p_7$ and $p_8$, which correspond to the numbered parts of the patterns $p_1$, $p_2$, $p_5$ and $p_6$ are numbered correspondingly. The patterns $p_7$ and $p_8$ have been applied to a top face, prepared for this purpose, of a layer stack or substrate 70, of which, in FIG. 7a to 7c inclusive, a rectangular part is shown in top view. Additionally, a coordinate system (xz) has been indicated whose z-axis has been chosen in accordance with the axis of symmetry of the symmetrical part of each combined pattern. The pattern $p_7$ has had four alignment features 71 to 74 inclusive added thereto and the pattern $p_8$ has had four alignment features 75 to 78 inclusive added thereto. Such alignment features are additionally applied to the layer stack at the same time as the pattern to which they have been added. The positions of the alignment features are such that during alignment they are precisely in register with one another when the patterns $p_7$ and $p_8$ are in the middle position, with respect to one another. In order to achieve a combined mask pattern suitable for the definition of an asymmetrical X junction, the pattern $p_7$, including the added alignment features 71 to 74 inclusive, is first applied to the top face of the layer stack 70 in a first mask material. Then the pattern $p_8$ is applied in a second mask material, partly over the pattern $p_7$. In so doing, the alignment features 75 to 78 inclusive must as well as possible be in register with the alignment features 71 to 74 inclusive, i.e. within a desired alignment accuracy. With reference to FIG. 1 it has already been indicated that it is solely the alignment accuracy in the x direction which plays a critical part. Therefore, the patterns $p_7$ and $p_8$ have been depicted with respect to one another in the case of exact alignment in the z direction, but within an alignment region in the x direction, hereinafter referred to as vertical alignment region. Said vertical alignment region is determined by the width ($w_1$) of the narrow strip-type spur 32. The fact is that, as long as the vertex L of the triangular spur 36 does not fall outside the lateral boundaries of the spur 32, the combined pattern formed from the patterns $p_7$ and $p_8$ is, as has already been expounded hereinabove with reference to the figures FIG. 4a to 4c inclusive and FIG. 6, always entirely symmetrical, to the left of the line z=v, in the z direction.

Figure 8:
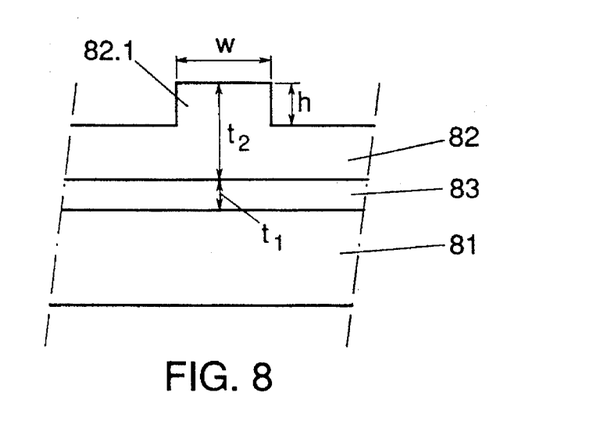
FIG. 8 shows, schematically in a transverse section, a profile of a waveguide of the ridge type.

A waveguide structure for an asymmetrical X junction which can be fabricated with such a combined pattern, has been simulated over the entire vertical alignment region determined by the width of the narrow strip-type spur 32. This simulation has been carried out with the aid of a simulation method which is generally known under the name beam propagation method. In so doing, an implementation was assumed involving channel-type waveguides of the "ridge loaded type" in a layer stack of III–V semiconductor materials such as indium phosphide (InP). FIG. 8 shows, schematically, a cross-sectional profile, on the basis of indium phosphide (InP), of such a type of channel-type waveguide. Between a substrate 81 and a top layer 82, both made of InP, there is a light-guiding layer 83 of InGaAsP of thickness $t_1$. The top layer 82 locally has, over the length of the guide, a ridge-like elevation 82.1 of height h and width w, which has been obtained, for example, starting from a top layer of an original thickness $t_2$, by partial etching away.

Figure 7A:
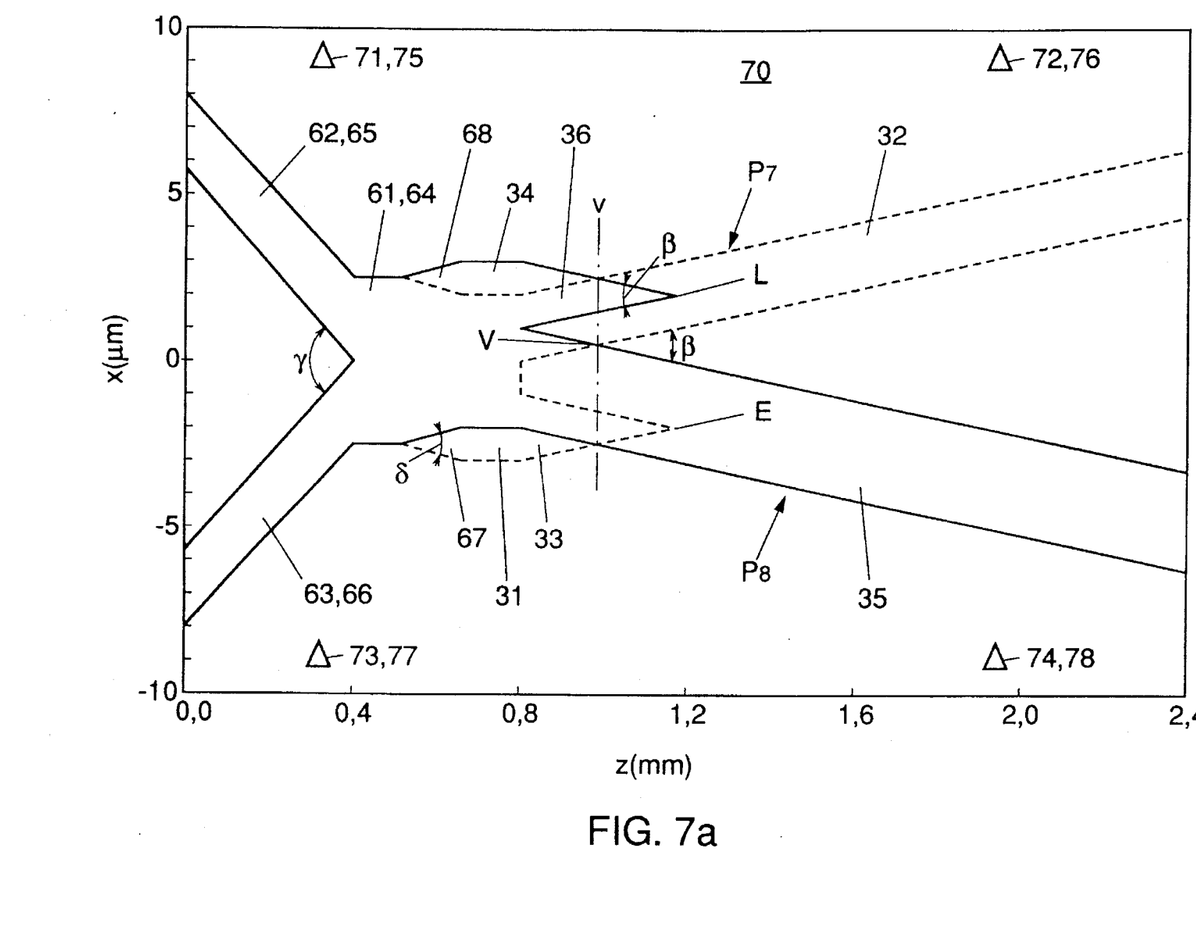
FIG. 7a shows a top view of a layer stack with a pair of mask patterns thereon in a first alignment position with respect to one another for the definition of an asymmetrical X junction.
Figure 7B:
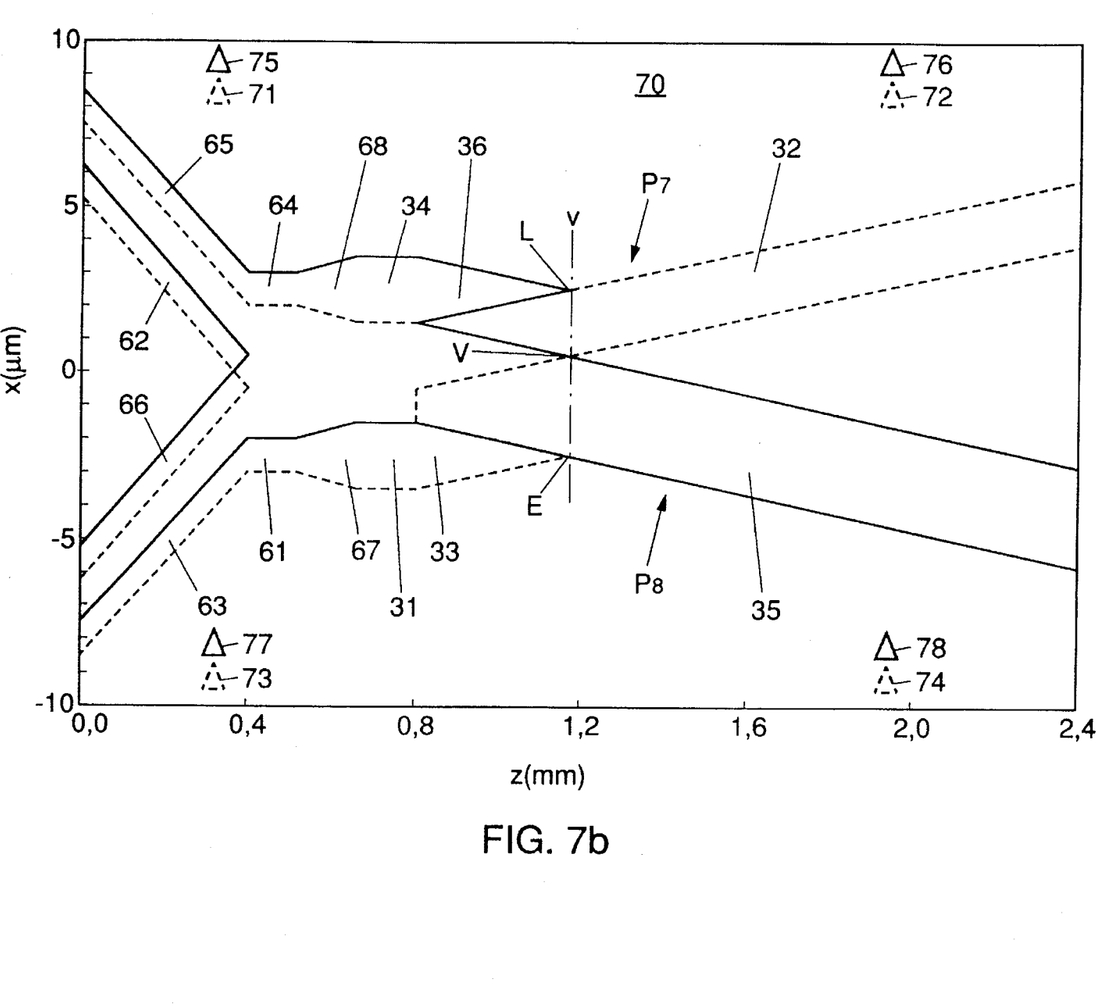
FIG. 7b like FIG. 7a, shows a top view of a layer stack with the pair of mask patterns thereon in a second alignment position with respect to one another.
Figure 7C:
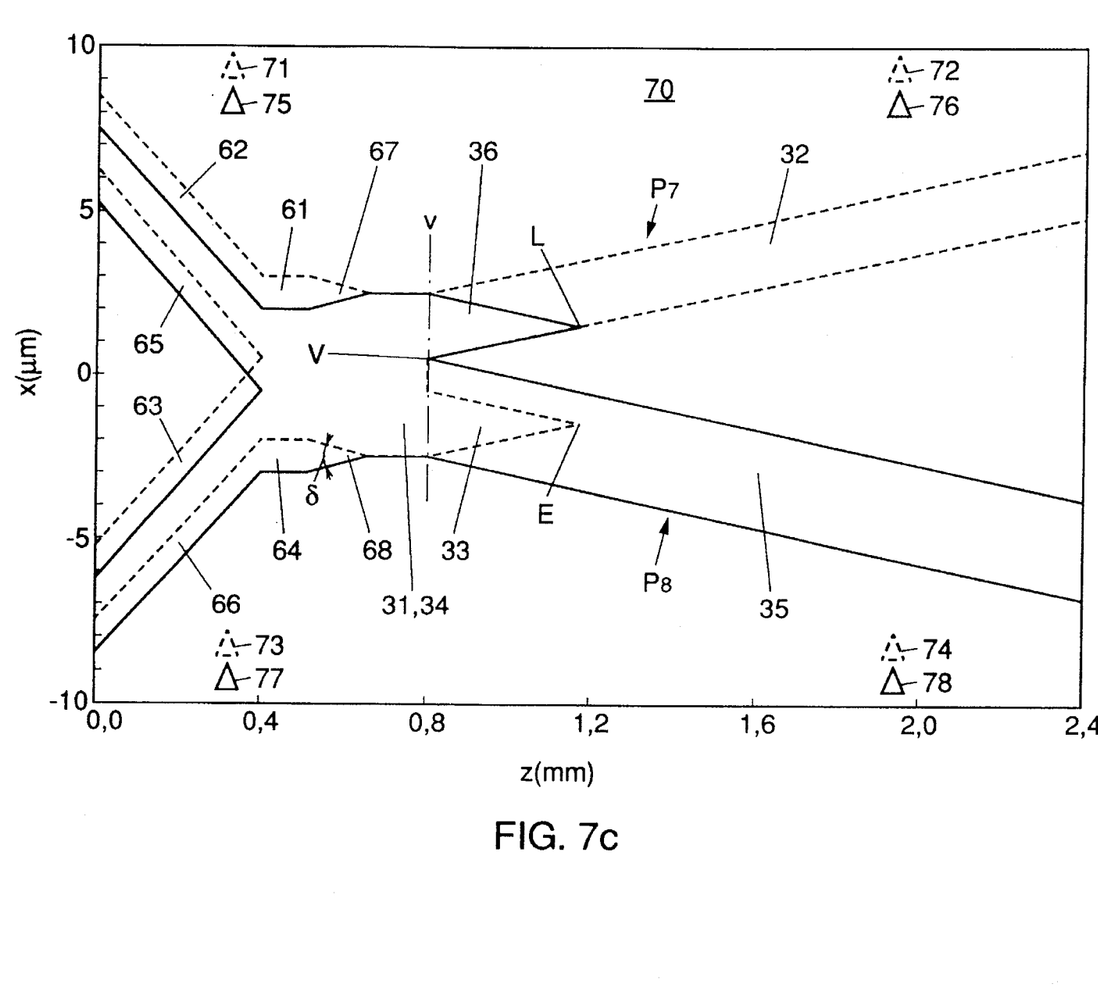
FIG. 7c like FIG. 7a, shows a top view of a layer stack with the pair of mask patterns thereon in a third alignment position with respect to one another.

The figures FIG. 7a to 7c inclusive depict, already to scale, the above-described combined pattern for an asymmetrical X junction. The length of the pattern is indicated in mm along a z-axis, while the width of the pattern along an x-axis is indicated in tan. A waveguide structure defined by such a combined pattern was simulated in terms of its signal-splitting behaviour. This simulation employed the following data:

wavelength ($\lambda$) of the optical signal: 1.5 µm refractive indices: InP: 3.1751, and InGaAsP: 3.4116 thickness ($t_1$) of the light-guiding layer 83 (InGaAsP): 460 nm thickness ($t_2$-h) of the top layer 82 (InP): 250 nm ridge height (h) above the top layer 82: 250 nm width of the strip-type spurs 62, 63, 65 and 66: 2.2 µm;

the angle of convergence $\gamma$ between the spurs 62 and 63, and the spurs 65 and 66: 26.3 mrad (=1.5°);

width (w) of the wide strip-type parts 31, 34, 61 and 64: 5.21 µm;

the angle d between the directions of the slips 67 and 68: 17.5 mrad (=1°);

width ($w_1$) of the narrow strip-type spur 32 (=length of the base of the triangular spurs 33 and 36): 2 µm;

width ($w_2$) of the wide strip-type spur 35: 3.2 µm;

the angle of divergence $\beta$ between the spurs 32 and 33 (= the apical angle of the triangular spurs 33 and 36): 4.9 mrad (=0.28°). It should be noted that the length of the wide strip-type parts 31, 34, 61 and 64 does not matter and that, in a practical implementation, it will be chosen to be virtually equal to zero in order to keep down as far as possible the total length of the asymmetrical X junction.

The alignment region in the x direction covers 2 µm, i.e. up to a deviation of at most ±1 µm from the exact alignment in the middle position of the patterns $p_7$ and $p_8$ with respect to one another.

Figure 9:
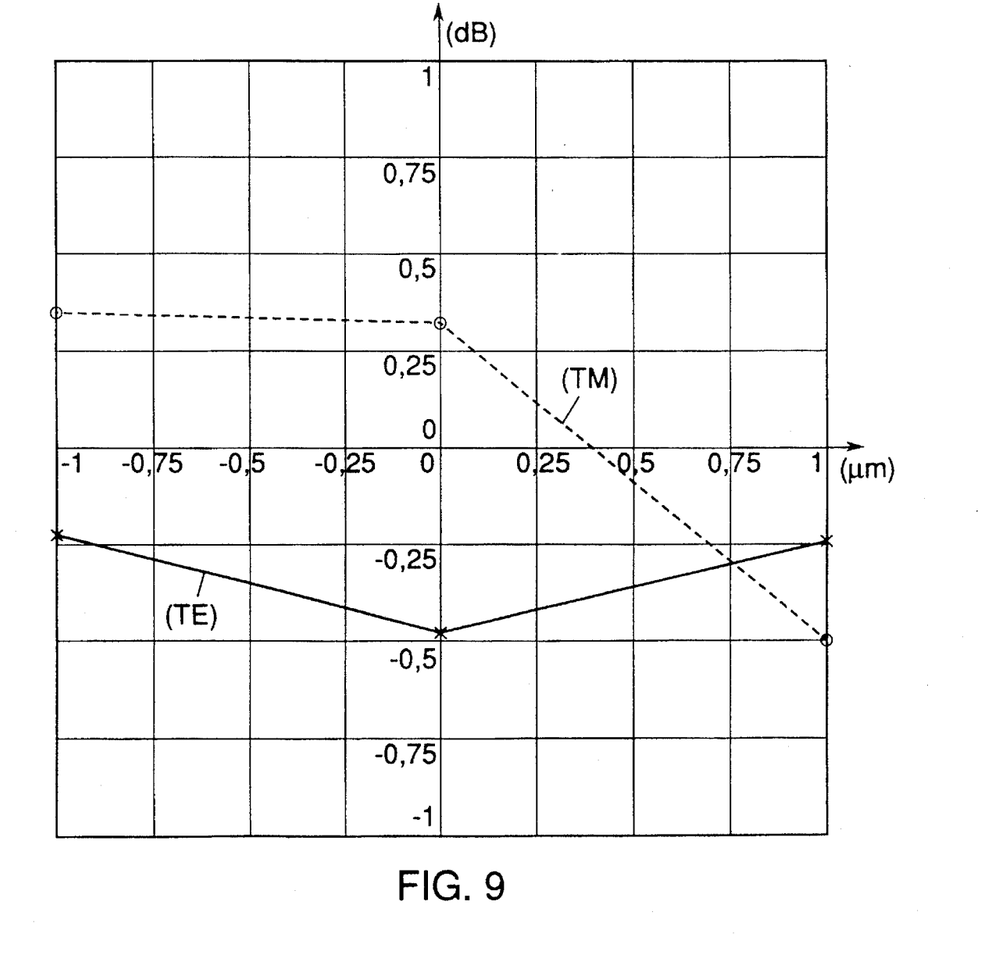
FIG. 9 is a graphic representation of simulation results in relation to signal splitting ratios in an asymmetrical X junction defined by the pair of mask patterns of FIG. 7a to 7c inclusive, as a function of the alignment accuracy with which the patterns of the pair of mask patterns have been aligned with respect to one another.

FIG. 9 shows a representation, in the form of a graph, of the simulation results. Along a horizontal axis, the deviation from exact alignment (0 µm) is plotted in the positive and negative x direction. Plotted along a vertical axis, in the case of an optical signal being launched into one of the input channels (corresponding to the input channels 11, 12 in FIG. 2) of the simulated asymmetrical X junction, is the splitting ratio in dB of the two output signals in the output channels (corres-ponding to the output channels 13 and 14 of FIG. 2). The continuous line (TE) indicates the variation of the splitting ratio over the alignment region when a purely TE polarized signal is launched, whereas the broken dashed line (TM) indicates a similar variation when a purely TM-polarized signal is launched. The course of the two lines demonstrates that over the entire alignment region the splitting ratio in absolute value is always less than 0.5 dB.

It should be noted that both the input channels and the output channels in the asymmetrical X junction can be constructed in a curved manner, for example S-shaped. To this end, the defining strip-type spurs in the mask patterns must be given a correspondingly curved shape, while in addition the triangular spurs must attain a shape which matches this.

It should also be noted that waveguide connections outside the interaction regions of the incoming and outgoing channel-type waveguides to other waveguide structures also to be integrated can be implemented in a simple manner by means of suitably chosen tapered pieces.

I claim:

1. A method for fabrication of an optical waveguide structure on or in a substrate, the substrate comprising a layer stack including a light-guiding layer, which optical waveguide structure includes an asymmetrically branched component structure, which method comprises the steps of:

applying a first mask pattern of a first mask material to a surface of the substrate for defining a part of the waveguide structure, applying a second mask pattern of a second mask material to said surface of the substrate to which the first mask pattern is applied, in a position which partly overlaps the first mask pattern, for defining, together with the first mask pattern, the entire waveguide structure, and treating portions of said surface of the substrate, which are not covered by the first and second mask pattern, with means for modifying the substrate material, wherein the optical waveguide structure further includes a symmetrically branched component structure which, via a symmetrically tapered intermediary waveguide is coupled to the asymmetrically branched component structure, and the first and second mask patterns each include a first asymmetrical component pattern and a second asymmetrical component pattern, the first component patterns individually defining an essentially separate component of the asymmetrically branched component structure and together defining all of the asymmetrically branched component structure and the second component patterns having shapes which are mirror images of one another, and wherein the step of applying the second mask pattern comprises a substep in which the second mask pattern is aligned with respect to the first mask pattern according to alignment directions essentially parallel and perpendicular to an axis of symmetry of the symmetrically branched component structure of the optical waveguide structure to be fabricated, the shape of the second component patterns depending on a predefined alignment tolerance in the alignment direction perpendicular to said axis of symmetry.

2. The method according to claim 1, wherein the optical waveguide structure comprises an asymmetrical X junction having a symmetrical Y junction and an asymmetrical Y junction, coupled via a channel-type connecting guide, the connecting guide being defined by parts of the second component patterns, the parts of the second component patterns having a shape such that the connecting guide exhibits expansions and contractions with respect to said axis of symmetry which run adiabatically and amount to no more than the predefined alignment tolerance.

3. The method according to claim 2, wherein the first asymmetrical component patterns of the first and second mask patterns define the asymmetrical Y junction and comprise strip-like patterns of different width, and said predefined alignment tolerance is determined by a width of a narrower one of the two strip-like patterns.

4. The method according to claim 3, wherein the second asymmetrical component patterns each include an essentially isosceles triangular extension piece, whose base is determined by the width of the narrower one of the two strip-like patterns and whose apical angle is equal to a desired splitting angle of the Y junction.

5. The method according to claim 4, wherein the second asymmetrical component patterns of the first and second mask patterns each define a separate branch of the symmetrical Y junction.

6. The method according to claim 4, wherein the second asymmetrical component patterns of the first and second mask patterns each define both branches of the symmetrical Y junction.

7. A pair of mask patterns on a support in a transferable form for the fabrication of an optical waveguide structure according to the method of claim 4.

8. The method according to claim 3, wherein the second asymmetrical component patterns of the first and second mask patterns each define a separate branch of the symmetrical Y junction.

9. The method according to claim 3, wherein the second asymmetrical component patterns of the first and second mask patterns each define both branches of the symmetrical Y junction.

10. A pair of mask patterns on a support in a transferable form for the fabrication of an optical waveguide structure according to the method of claim 3.

11. The method according to claim 2, wherein the second asymmetrical component patterns of the first and second mask patterns each define a separate branch of the symmetrical Y junction.

12. A pair of mask patterns on a support in a transferable form for the fabrication of an optical waveguide structure according to the method of claim 11.

13. The method according to claim 2, wherein the second asymmetrical component patterns of the first and second mask patterns each define both branches of the symmetrical Y junction.

14. A pair of mask patterns on a support in a transferable form for the fabrication of an optical waveguide structure according to the method of claim 13.

15. A pair of mask patterns on a support in a transferable form for the fabrication of an optical waveguide structure according to the method of claim 1.

16. An optical waveguide structure, which includes an asymmetrical X junction having a symmetrical Y junction and an asymmetrical Y junction, coupled via a channel-type connecting guide, the optical waveguide structure being fabricated on or in a substrate comprising a layer stack including a light-guiding layer by the following steps:

applying a first mask pattern of a first mask material to a surface of the substrate for defining a part of the waveguide structure, applying a second mask pattern of a second mask material to said surface of the substrate to which the first mask pattern is applied, in a position which partly overlaps the first mask pattern, for defining, together with the first mask pattern, the entire waveguide structure, and treating portions of said surface of the substrate, which are not covered by the first and second mask pattern, with means for modifying the substrate material, wherein the optical waveguide structure further includes a symmetrically branched component structure which, via a symmetrically tapered intermediary waveguide is coupled to the asymmetrically branched component structure, and the first and second mask patterns each include a first asymmetrical component pattern and a second asymmetrical component pattern, the first component patterns individually defining an essentially separate component of the asymmetrically branched component structure and together defining all of the asymmetrically branched component structure and the second component patterns having shapes which are mirror images of one another, and wherein the step of applying the second mask pattern comprises a substep in which the second mask pattern is aligned with respect to the first mask pattern according to alignment directions essentially parallel and perpendicular to an axis of symmetry of the symmetrically branched component structure of the optical waveguide structure to be fabricated, the shape of the second component patterns depending on a predefined alignment tolerance in the alignment direction perpendicular to said axis of symmetry.

17. The optical waveguide structure according to claim 16, wherein the first asymmetrical component patterns of the first and second mask patterns define the asymmetrical Y junction and comprise strip-like patterns of different width, and said predefined alignment tolerance is determined by a width of a narrower one of the two strip-like patterns.

18. The optical waveguide structure according to claim 17, wherein the second asymmetrical component patterns each include an essentially isosceles triangular extension piece, whose base is determined by the width of the narrower one of the two strip-like patterns and whose apical angle is equal to a desired splitting angle of the Y junction.

19. The optical waveguide structure according to claim 18, wherein the second asymmetrical component patterns of the first and second mask patterns each define a separate branch of the symmetrical Y junction.

20. The optical waveguide structure according to claim 18, wherein the second asymmetrical component patterns of the first and second mask patterns each define both branches of the symmetrical Y junction.

* * * * *